United States Patent
Zhong et al.

(10) Patent No.: US 11,270,190 B2
(45) Date of Patent: Mar. 8, 2022

(54) METHOD AND APPARATUS FOR GENERATING TARGET NEURAL NETWORK STRUCTURE, ELECTRONIC DEVICE, AND STORAGE MEDIUM

(71) Applicant: Beijing SenseTime Technology Development Co., Ltd, Beijing (CN)

(72) Inventors: Zhao Zhong, Beijing (CN); Junjie Yan, Beijing (CN); Chenglin Liu, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 658 days.

(21) Appl. No.: 16/200,140

(22) Filed: Nov. 26, 2018

(65) Prior Publication Data

US 2019/0095780 A1    Mar. 28, 2019

Related U.S. Application Data

(63) Continuation of application No. PCT/CN2018/100914, filed on Aug. 17, 2018.

(30) Foreign Application Priority Data

Aug. 18, 2017  (CN) .......................... 201710718042.2

(51) Int. Cl.
*G06N 3/04* (2006.01)
*G06N 3/08* (2006.01)
*G06N 3/00* (2006.01)

(52) U.S. Cl.
CPC ......... *G06N 3/0472* (2013.01); *G06N 3/0454* (2013.01); *G06N 3/082* (2013.01); *G06N 3/084* (2013.01); *G06N 3/006* (2013.01)

(58) Field of Classification Search
CPC ............................ G06N 3/0454; G06N 3/082
See application file for complete search history.

(56) References Cited

U.S. PATENT DOCUMENTS

| 2015/0100530 | A1 | 4/2015 | Mnih et al. |
| 2017/0140272 | A1 | 5/2017 | Goodfellow et al. |
| 2018/0114110 | A1* | 4/2018 | Han ....................... G06N 3/063 |

FOREIGN PATENT DOCUMENTS

| CN | 101726742 | 6/2010 |
| CN | 106203330 | 12/2016 |

(Continued)

OTHER PUBLICATIONS

Fiszelew, A., et al. "Finding optimal neural network architecture using genetic algorithms." Advances in computer science and engineering research in computing science 27 (2007): 15-24. (Year: 2007).*

(Continued)

*Primary Examiner* — Hal Schnee
(74) *Attorney, Agent, or Firm* — Syncoda LLC; Feng Ma (57) ABSTRACT

Embodiments of the present application disclose a method and apparatus for generating a neural network structure, an electronic device, and a storage medium. The method comprises: sampling a neural network structure to generate a network block, the network block comprising at least one network layer; constructing a sampling neural network based on the network block; training the sampling neural network based on sample data, and obtaining an accuracy corresponding to the sampling neural network; and in response to that the accuracy does not meet a preset condition, regenerating a new network block according to the accuracy until a sampling neural network constructed by the new network block meets the preset condition, and using the sampling neural network meeting the preset condition as a target neural network.

20 Claims, 3 Drawing Sheets

(56) References Cited

FOREIGN PATENT DOCUMENTS

| CN | 106778902 |   | 5/2017 |
|----|-----------|---|--------|
| CN | 105701540 | B | 12/2017 |
| CN | 108229647 |   | 6/2018 |
| CN | 109902186 | A | 6/2019 |
| JP | H049566 | A | 1/1992 |
| JP | H04353963 | A | 12/1992 |
| JP | H087483 | A | 1/1996 |
| JP | 2015011510 | A | 1/2015 |
| KR | 20180089769 | A | 8/2018 |

OTHER PUBLICATIONS

First Office Action of the Japanese application No. 2020-508039, dated Sep. 1, 2020.
Notice of Allowance of the Korean application No. 10-2020-7005617, dated Sep. 18, 2020.
Neural Architecture Search with reinforcement learning. Feb. 15, 2017.
Chelsea Finn, Pieter Abbeel, Sergey Levine; Model-Agnostic Meta-Learning for Fast Adaptation of Deep Networks. Jul. 18, 2017.
International Search Report in the international application No. PCT/CN2018/100914, dated Sep. 27, 2018.
English Translation of the Written Opinion of the International Search Authority in the international application No. PCT/CN2018/100914, dated Sep. 27, 2018.
First Office Action of the Korean application No. 10-2020-7005617, dated May 18, 2020.
Zhao Zhong, Junjie Yan, Cheng-Lin Liu, Practical Network Blocks Design with Q-Learning, Submitted on Aug. 18, 2017.

\* cited by examiner

METHOD AND APPARATUS FOR GENERATING TARGET NEURAL NETWORK STRUCTURE, ELECTRONIC DEVICE, AND STORAGE MEDIUM

CROSS-REFERENCE TO RELATED APPLICATIONS

This is a continuation of International Application PCT/CN2018/100914, with an international filing date of Aug. 17, 2018, which claims priority to Chinese Patent Application No. 201710718042.2, entitled "METHOD AND APPARATUS FOR GENERATING NEURAL NETWORK STRUCTURE, ELECTRONIC DEVICE, AND STORAGE MEDIUM", and filed with the China National Intellectual Property Administration (CNIPA) on Aug. 18, 2017, the contents of which are incorporated herein by reference in their entireties.

TECHNICAL FIELD

The present application relates to artificial intelligence technologies, and in particular, to a method and apparatus for generating a neural network structure, an electronic device, and a storage medium.

BACKGROUND

A neural network is an algorithm mathematical model of implementing distributed parallel information processing by simulating animal neural network behavior characteristics. With the development of computer vision technologies, the neural network, as a core technology in an image recognition system, has been widely applied to technical fields, such as security monitoring, finance, and even unmanned driving. Neural networks with different structures and parameters are required for different tasks or different application scenarios.

SUMMARY

Embodiments of the present application provide a technical solution of generating a neural network structure.

According to the first aspect of the embodiments of the present application, a method for generating a neural network structure is provided, comprising: sampling the neural network structure to generate a network block, the network block comprising at least one network layer; constructing a sampling neural network based on the network block; training the sampling neural network based on sample data, and obtaining an accuracy corresponding to the sampling neural network; and in response to that the accuracy does not meet a preset condition, regenerating a new network block according to the accuracy until a sampling neural network constructed by the new network block meets the preset condition, and using the sampling neural network meeting the preset condition as a target neural network.

According to the second aspect of the embodiments of the present application, an apparatus for generating a neural network structure is provided, comprising: a sampling unit, configured to sample a neural network structure to generate a network block, the network block comprising at least one network layer; a network construction unit, configured to construct a sampling neural network based on the network block; a training unit, configured to train the sampling neural network based on sample data, and obtaining an accuracy corresponding to the sampling neural network; and a network output unit, configured to, in response to that the accuracy does not meet a preset condition, regenerate a new network block according to the accuracy until a sampling neural network constructed by the new network block meets the preset condition, and using the sampling neural network meeting the preset condition as a target neural network.

According to the third aspect of the embodiments of the present application, an electronic device is provided, comprising a processor, the processor comprising the apparatus for generating a neural network structure as stated above.

According to the fourth aspect of the embodiments of the present application, disclosed is an apparatus for generating a neural network structure, comprising: a processor; and a memory storing instructions, the instructions when executed by the processor, cause the processor to perform operations, the operations comprising: sampling the neural network structure to generate a network block, the network block comprising at least one network layer; constructing a sampling neural network based on the network block; training the sampling neural network based on sample data, and obtaining an accuracy corresponding to the sampling neural network; and in response to that the accuracy does not meet a preset condition, regenerating a new network block according to the accuracy until a sampling neural network constructed by the new network block meets the preset condition, and using the sampling neural network meeting the preset condition as a target neural network.

According to the fifth aspect of the embodiments of the present application, disclosed is a non-transitory computer storage medium for storing computer readable instructions, the computer readable instruction when executed by a processor, causes the processor to perform operations, the operations comprising: sampling the neural network structure to generate a network block, the network block comprising at least one network layer; constructing a sampling neural network based on the network block; training the sampling neural network based on sample data, and obtaining an accuracy corresponding to the sampling neural network; and in response to that the accuracy does not meet a preset condition, regenerating a new network block according to the accuracy until a sampling neural network constructed by the new network block meets the preset condition, and using the sampling neural network meeting the preset condition as a target neural network.

Based on a method and apparatus for generating a neural network structure, an electronic device, and a computer storage medium provided in the embodiments of the present application, a neural network structure is sampled to generate a network block; a sampling neural network is constructed based on the network block, where construction of the sampling neural network by means of sampling avoids manual network structure configuration; the sampling neural network is trained based on sample data, and an accuracy corresponding to the sampling neural network is obtained, where by means of training, parameters in the sampling neural network get better for a current structure so that a better accuracy corresponding to the sampling neural network can be obtained; and in response to that the accuracy does not meet a preset condition, a new network block is regenerated according to the accuracy until a sampling neural network constructed by the new network block meets the preset condition, and the sampling neural network meeting the preset condition is used as a target neural network. For a sampling neural network generated by means of reinforcement learning based on sample data, the sampling neural network can achieve an expected accuracy for a task and/or data corresponding to sample data, thereby reducing costs and time for network structure design.

The following further describes in detail the technical solutions of the present application with reference to the accompanying drawings and embodiments.

BRIEF DESCRIPTION OF THE DRAWINGS

The accompanying drawings constituting a part of the specification are used for describing embodiments of the present application and are intended to explain the principles of the present application together with the descriptions.

According to the following detailed descriptions, the present application can be understood more clearly with reference to the accompanying drawings.

DETAILED DESCRIPTION

Various exemplary embodiments of the present application are now described in detail with reference to the accompanying drawings. It should be noted that, unless otherwise stated specifically, relative arrangement of the components and steps, the numerical expressions, and the values set forth in the embodiments are not intended to limit the scope of the present application.

In addition, it should be understood that, for ease of description, the size of each part shown in the accompanying drawings is not drawn in actual proportion.

The following descriptions of at least one exemplary embodiment are merely illustrative actually, and are not intended to limit the present application and the applications or uses thereof.

Technologies, methods and devices known to persons of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present application may be applied to computer systems/servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer systems/servers may be described in the general context of computer system executable instructions (for example, program modules) executed by the computer system. Generally, the program modules may include routines, programs, target programs, components, logics, data structures, and the like, to execute specific tasks or implement specific abstract data types. The computer system/server may be practiced in the distributed cloud computing environments in which tasks are executed by remote processing devices that are linked through a communications network. In the distributed cloud computing environments, program modules may be located in local or remote computing system storage media including storage devices.

Figure 1:
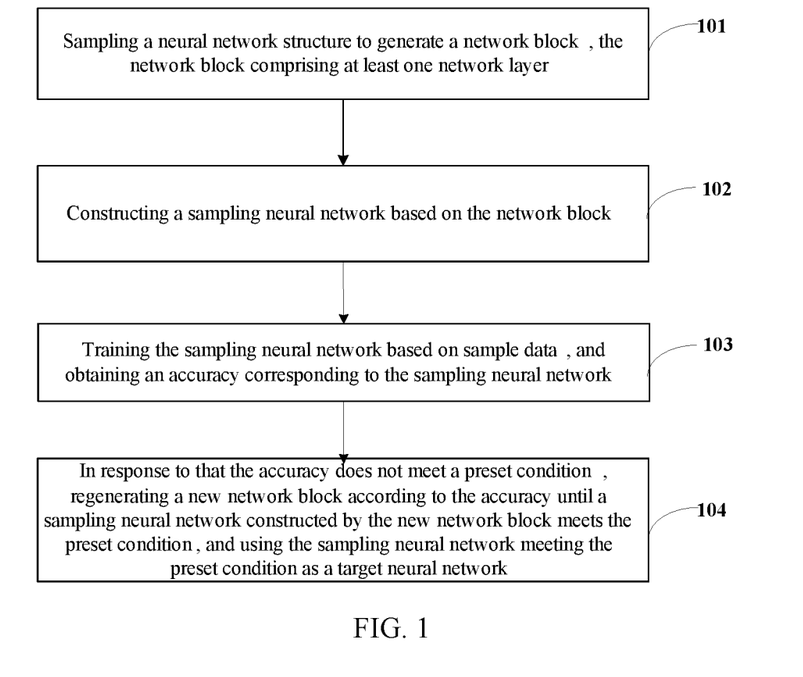
FIG. 1 is a flowchart of an embodiment of a method for generating a neural network structure of the present application.

FIG. 1 is a flowchart of an embodiment of a method for generating a neural network structure of the present application. As shown in FIG. 1, the method of this embodiment comprises:

Step 101, sampling a neural network structure to generate a network block, the network block comprising at least one network layer.

The neural network structure comprises network layers, network parameters corresponding to the network layers, a set connection mode between the network layers, etc., wherein the network layers may comprise some or all types of network layers in the prior art. The present application does not limit types and a number of the network layers constituting the network block. The network layers indicated in the present application refer to units configured to construct a neural network and capable of separately implementing a specific function, such as a convolution layer, a pooling layer, and a full concat layer.

In an optional example, the step 101 may be executed by a processor by invoking a corresponding instruction stored in a memory, or may be executed by a sampling unit 51 run by the processor.

Step 102, constructing a sampling neural network based on the network block.

The neural network comprises at least one network block; and the network block is used as a network sub-structure. In the present application, the trained sampling neural network may be preconfigured to be constituted by K network blocks, wherein the structure of the K network blocks may be identical or different, and K is an integer greater than or equal to 1. The value of K is determined according to balancing of the training efficiency and precision in practical application.

In an optional example, the step 102 may be executed by a processor by invoking a corresponding instruction stored in a memory, or may be executed by a network construction unit 52 run by the processor.

Step 103, training the sampling neural network based on sample data, and obtaining an accuracy corresponding to the sampling neural network.

In an optional example, the step 103 may be executed by a processor by invoking a corresponding instruction stored in a memory, or may be executed by a training unit 53 run by the processor.

Step 104, in response to that the accuracy does not meet a preset condition, regenerating a new network block according to the accuracy until a sampling neural network constructed by the new network block meets the preset condition, and using the sampling neural network meeting the preset condition as a target neural network.

A target neural network of which the accuracy meets the preset condition will be obtained by means of training. Parameters in the target neural network are trained and thus are better parameters for the sample data. Therefore, the structure and parameters of the output target neural network are all suitable for the sample data, thereby realizing automatic provision of a target neural structure with better structure and parameters for a specific task.

In an optional example, the step 104 may be executed by a processor by invoking a corresponding instruction stored in a memory, or may be executed by a network output unit 54 run by the processor.

Based on a network training method provided in the embodiments of the present application, a neural network structure is sampled to generate a network block; a sampling neural network is constructed based on the network block, where construction of the sampling neural network by means of sampling avoids manual network structure configuration; the sampling neural network is trained based on sample data, and an accuracy corresponding to the sampling neural network is obtained, where by means of training, parameters in the sampling neural network get better for a current structure so that a better accuracy corresponding to the sampling neural network can be obtained; and in response to that the accuracy does not meet a preset condition, a new network block is regenerated according to the accuracy until a sampling neural network constructed by the new network block meets the preset condition, and the sampling neural network meeting the preset condition is used as a target neural network. For a sampling neural network generated by means of reinforcement learning based on sample data, the sampling neural network can achieve an expected accuracy for a task and/or data corresponding to sample data, thereby reducing costs and time for network structure design.

According to another embodiment of a method for generating a neural network structure of the present application, on the basis of the embodiment, the step 101 comprises: sampling a neural network structure based on a probability vector to obtain at least one type of network layers, network parameters corresponding to the at least one type of network layers, and a connection mode between the at least one type of network layers, and stacking the at least one type of network layers to constitute a network block.

In this embodiment, a network layer database comprises at least one type of network layers, and therefore, at least one type of network layers can be sampled by performing sampling through probability vectors of the number of the types of corresponding network layers, a network layer has corresponding network parameters, and thus network parameters of a corresponding network layer are also acquired in a sampling process at the same time; and different network layers have respective preset connection modes, and thus optionally, a connection mode between network layers can also be acquired while the network layers are acquired at the same time. Each probability value in a probability vector corresponds to one type of network layers; when the probability value corresponding to a certain type of network layer is 0, the network block constituted by means of sampling does not comprise the type of network layer; and the probability value in the probability vector can also be used to determine the number of each type of network layers obtained by means of sampling, and the sampled number of each type of network layers is not limited to one.

In an optional example of the embodiments of a method for generating a neural network structure of the present application, the network layer comprises any one or more of: a convolution layer, a max pooling layer, an average pooling layer, an identity layer, an elemental add layer, a concat layer, etc.

Figure 2:
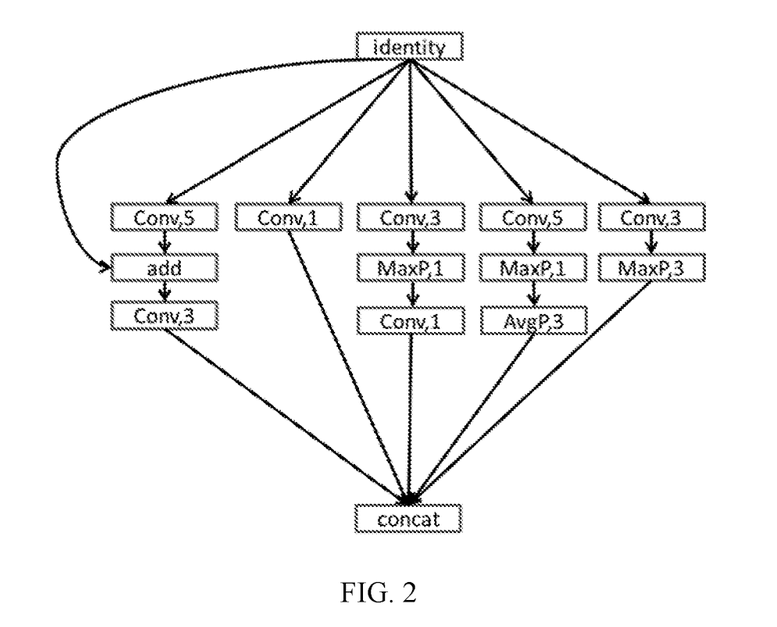
FIG. 2 is a schematic structural diagram of a network block constructed based on a network layer in the embodiments of the present application.
Figure 3:
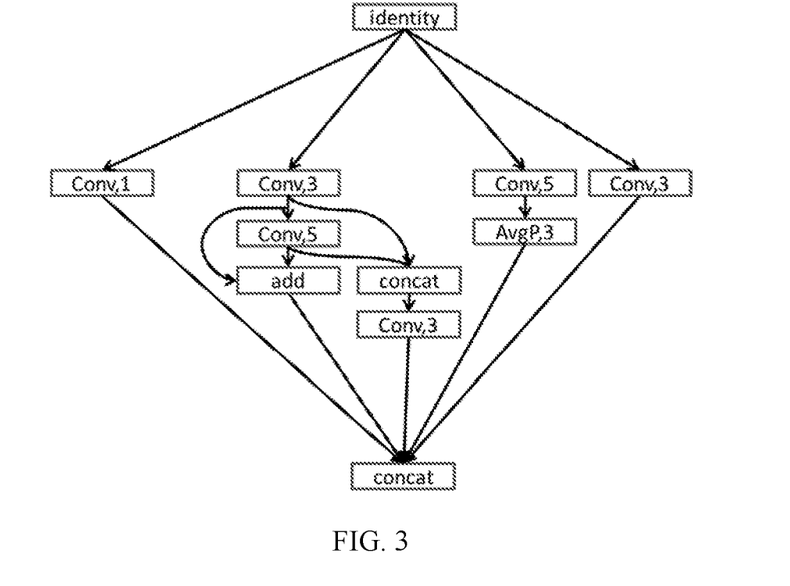
FIG. 3 is a schematic structural diagram of another network block constructed based on a network layer in the embodiments of the present application.

The network layers above listed in this embodiment are to facilitate understanding and implementation of persons skilled in the art, and are not used to limit the present application. Convolution achieves a result of summation after multiplying two variables within a certain range, i.e., a convolution layer. The convolution layer may consist of several convolution units, and parameters of the convolution units are obtained by means of optimization of a backpropagation algorithm. The purpose of a convolution operation is to extract different input features, where the first layer of the convolution layer can only extract some low-level features, such as edges, lines, and angles, and a network with more layers can iteratively extract more complex features from the low-level features. The mainly function of max pooling layer is to achieve pixel downsampling by selecting the maximum feature point in a neighborhood without damaging a recognition result. The mainly function of average pooling layer is to achieve pixel downsampling by averaging feature points in the neighborhood without damaging the recognition result. Output of the identity layer is equivalent to its input, which is mainly to facilitate combination of different network layers. The elemental add layer is used to add received features of different network layers together. The mainly function of concat layer is to concat the received features of different network layers together. FIG. 2 is a schematic structural diagram of a network block constructed based on a network layer in the embodiments of the present application, comprising: an identity layer, a convolution layer, an elemental add layer, a max pooling layer, an average pooling layer, and a concat layer. FIG. 3 is a schematic structural diagram of another network block constructed based on a network layer in the embodiments of the present application, comprising: an identity layer, a convolution layer, an elemental add layer, an average pooling layer, and contact concat layer. It can be known from the network block structures shown in FIGS. 2 and 3 that some or all types of network layers can be comprised to constitute a network block, and the number of each type of network layers is not fixed.

In an optional example of the embodiments of a method for generating a neural network structure of the present application, the stacking the at least one type of network layers to obtain a network block comprises: analyzing network layers obtained by sampling to obtain at least one type of the network layers, a number of at least one type of the network layers, and a connection sequence of at least one type of the network layers; and connecting the obtained network layers according to the connection sequence corresponding to the at least one type of network layers through a connection relationship between the at least one type of network layers so as to obtain a network block.

In this embodiment, in order to construct a network block, elements (network layers) comprised in the network block shall be firstly determined, and determination of the network layers comprises determining types and a number; after the types and number of the network layers are determined, it is required to determine a connection sequence and a connection relationship of the network layers, and optionally, it can be set that for each network layer, which network layer serves as its previous network layer; after the previous network layer of a network layer is determined, the obtained network layers can be stacked together to constitute the network block. A group of network layers having the same type and number can constitute various network blocks through different stacking modes.

According to another embodiment of a method for generating a neural network structure of the present application, on the basis of the embodiments above, the step 104 comprises: adjusting the probability vector of sampling the neural network structure according to the accuracy corresponding to the sampling neural network, and sampling the neural network structure through the probability vector to generate a new network block.

In this embodiment, optionally, the structure of the network block is adjusted by means of reinforcement learning. When the accuracy of the neural network cannot reach a set value, it is indicated that this neural network structure is not good enough, a low reward is returned, sampling is performed again to constitute the new network block, and the neural network is constructed with the new network block until the neural network of which the accuracy comes up to the standard is obtained.

Whether the neural network comes up to a standard is determined according to the accuracy. When the accuracy of the neural network cannot reach the set value, it is indicated that the structure of this neural network is not applicable to current sample data. However, at the moment, parameters in the neural network have been trained to get better. Therefore, at the moment, it is required to adjust the network structure. The network block is the main one that can be adjusted in the network structure. Therefore, it is required to adjust the structure of the network block. Adjustment to the structure of the network block can be achieved by adjusting the number of the network layers in the network block or by adjusting the connection relationship of the network layers in the network block. At least one type of network blocks is constructed for sampled network layers though different connection relations every time (for at least one type of network blocks: the type and number of the network layers are identical, and positions of the network layers and the connection relationship between the network layers are different), and therefore, the number of the network layers constituting the network block is changed by changing the sampling probability vector, so as to change the network block structure.

According to another embodiment of a method for generating a neural network structure of the present application, on the basis of the embodiments, the training the sampling neural network based on sample data in step 103 comprises: processing the sample data by using the sampling neural network to obtain a processing result; calculating an error value between supervision information marked in the sample data and the processing result by using a loss function, the sample data being marked with the supervision information; and training the sampling neural network based on the error value until the sampling neural network meets a convergence condition.

The sample data is marked with the supervision information; the supervision information is a known target result of the sample data needing to be processed by the corresponding sampling neural network; and the content of the supervision information determines functions of the trained neural network.

In this embodiment, in order to ensure that the structure of a constructed neural network is adapted to specific task data, it is required to use sample data corresponding to the task data to train the neural network so as to recognize whether the neural network can accurately process the task data. The common reverse gradient algorithm in the art can be used to implement the neural network training process.

The training result is that parameters in the neural network get better. The error value between the supervision information and the processing result obtained at the moment can be used to determine the accuracy of the neural network. The accuracy is inversely proportional to the error value, i.e., the greater the error value is, the smaller the accuracy is, and thus the poorer the processing effect of the sample data by the neural network is, and the smaller the error value is, the greater the accuracy is, and thus the better the processing effect of the sample data by the neural network is.

In an optional example of the embodiments of a method for generating a neural network structure of the present application, the training the sampling neural network based on the error value until the sampling neural network meets a convergence condition comprises: in response to that a convergence rate of the loss function is greater than or equal to a preset value, adjusting parameters in the sampling neural network through a reverse gradient algorithm according to the obtained error value to obtain an adjusted sampling neural network until the convergence rate of the loss function corresponding to the adjusted neural network is smaller than the preset value.

In this embodiment, whether the neural network is applicable to processing the sample data cannot be determined, and therefore, the convergence condition cannot be achieved by setting the error value (there may be a situation that no matter how many times the neural network has been trained, the error value can still not reach the requirement). In order to enable parameters in the neural network to get better, it is required to perform evaluation through the convergence rate of the loss function. When the convergence rate of the loss function is decreased below the preset value, it is indicated that further iteration will yield little influence on the error value, and at the moment, the training is ended, the corresponding error vale is output, and the accuracy of the neural network for the sample data is further calculated.

In an optional example of the embodiments of a method for generating a neural network structure of the present application, the training the sampling neural network based on the error value until the sampling neural network meets a convergence condition comprises: in response to that a frequency of calculating the error value using the loss function is smaller than a preset value, adjusting parameters in the sampling neural network through a reverse gradient algorithm according to the obtained error value to obtain an adjusted sampling neural network, and adding the frequency of calculating the error value using the loss function by 1 until the frequency of calculating the error value using the loss function corresponding to the adjusted neural network is greater than or equal to the preset value.

In this embodiment, in order to complete fast training of the neural network, a preset value is provided to control an iteration frequency. When the frequency of iterative training reaches the preset value, the training is stopped so that generation of the neural network structure is accelerated.

In an optional example of the embodiments of a method for generating a neural network structure of the present application, the step 103 further comprises: calculating a predictive accuracy of the sampling neural network according to the error value of the trained sampling neural network; and subtracting a preset proportion of network computing complexity and a preset proportion of network density based on the predictive accuracy to obtain an accuracy corresponding to the sampling neural network, the network computing complexity and the network density corresponding to the sampling neural network.

The embodiments above propose to end the training when iteration has been performed for the set frequency. However, the accuracy obtained by ending the training at the moment is necessarily not a better accuracy of the sampling neural network. This embodiment corrects the accuracy issue. An optional correction mode may be achieved by using formula (1):

$$\text{reward}=\text{accuracy}-\tfrac{1}{2}\log(\text{FLOPs})-\tfrac{1}{2}\log(\text{density}) \quad \text{Formula (1)},$$

Here reward refers to the accuracy, accuracy refers to the predictive accuracy, and FLOPs refers to an abbreviation of floating-point operations per second (also referred to as peak rates per second), i.e., a frequency of floating-point operations carried out per second, which is a measure of computer performance and is particularly useful in fields of scientific computations that use a large number of floating-point operations. A theoretical estimation formula of FLOPs, as the network computing complexity of the neural network, can be, but is not limited to, formula (2):

$$\text{FLOPs}=O(\Sigma_{l=1}^{d} n_{l-1} \cdot s_l^2 \cdot n_l \cdot m_l^2) \quad \text{Formula (2)},$$

Here $n_{l-1}$ refers to the number of input channels of the sampling neural network of this layer, $n_l$ refers to the number of output channels of the sampling neural network of this layer, $s_l$ refers to a convolution kernel size, and $m_l$ refers to a size of a feature map output from this layer. Density refers to a network density, i.e., a result of dividing the number of edges of the map (in the field of mathematics) by the number of points for measuring the complexity of the map. The accuracy obtained by means of correction of formula (1) can be used as the accuracy of the neural network corresponding to the sample data. Meanwhile, using the corrected accuracy can rapidly enable the accuracy of the neural network to be converged to the present condition, so as to improve the network training rate.

According to another embodiment of a method for generating a neural network structure of the present application, on the basis of the embodiments above, the step 101 may comprise: sampling a neural network structure to generate N network blocks, N being an integer greater than zero.

Exemplarily, the sampling process can be implemented using an agent, and the N network blocks are sent to a network controller.

In an optional example, the step 101 may be executed by a processor by invoking a corresponding instruction stored in a memory, or may be executed by a sampling unit 51 run by the processor.

The step 102 may comprise: respectively constructing N sampling neural networks based on the N network blocks.

Exemplarily, the process of constructing the sampling neural networks can be implemented by means of a network structure controller. The network controller sends the N sampling neural networks respectively to N training nodes (environment variables, envs), wherein env represents an external command, and all the environment variables and values thereof are listed in a program file.

In an optional example, the step 102 may be executed by a processor by invoking a corresponding instruction stored in a memory, or may be executed by a network construction unit 52 run by the processor.

The step 103 may comprise: respectively training the N sampling neural networks based on sample data, and obtaining N accuracies corresponding to the N sampling neural networks.

Exemplarily, the N sampling neural networks are trained respectively by the N training nodes (environment variables, envs), and sample data received by those training nodes is identical or similar (on the basis that extraction is performed from a sample data set of an identical training target).

In an optional example, the step 103 may be executed by a processor by invoking a corresponding instruction stored in a memory, or may be executed by a training unit 53 run by the processor.

The step 104 may comprise: in response to that there is no accuracy among the N accuracies that meets a preset condition, respectively regenerating N new network blocks according to the N accuracies until there is a neural network among the N sampling neural networks respectively constructed by the N new network blocks that meets the preset condition, and using the sampling neural network meeting the preset condition as a target neural network.

Exemplarily, the N accuracies obtained based on the N training nodes are transmitted to the agent by the network controller; according to the accuracies, the agent judges whether any of the sampling neural networks is the target neural network; and when none of the sampling neural networks is the target neural network, a sampling probability is corrected to obtain new network blocks and reconstruct new sampling neural networks.

In an optional example, the step 104 may be executed by a processor by invoking a corresponding instruction stored in a memory, or may be executed by a network output unit 54 run by the processor.

Figure 4:
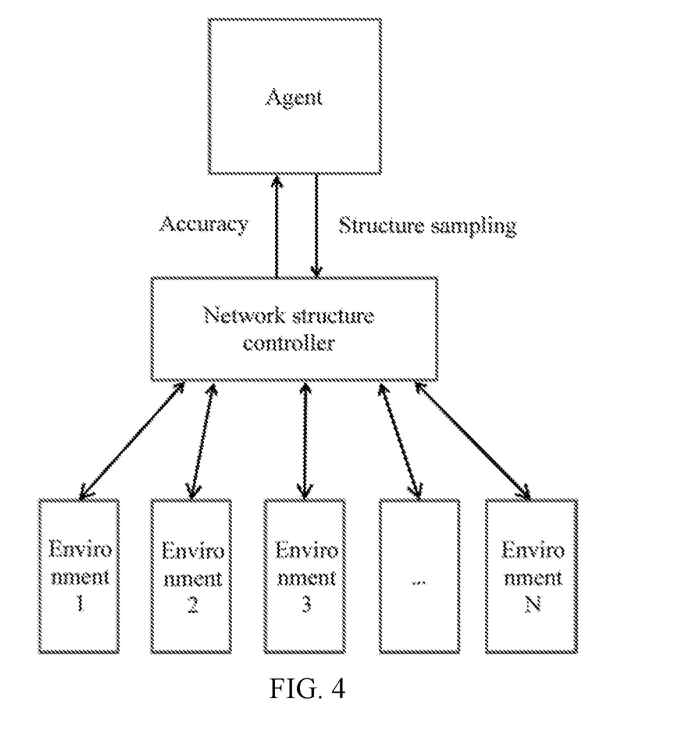
FIG. 4 is a schematic structural diagram of a distributed system constructed according to the method of the present application.

In this embodiment, FIG. 4 is a schematic structural diagram of a distributed system constructed according to the method of the present application. As shown in FIG. 4, simultaneous training of multiple different neural networks is achieved by constructing a distributed system comprising an agent, a network structure controller and at least one training node (environment variable, env; corresponding to environment 1, environment 2, . . . , and environment N in FIG. 4; that is, each environment in FIG. 4 represents a training node), such that the generation rate of a neural network structure is increased, the training time is saved, and the training efficiency of the neural network is improved.

The quality of a neural network is evaluated through an accuracy corresponding to the neural network; When the accuracy reaches a preset condition, it can be considered that the neural network meets the requirement, and thus can process task data corresponding to sample data and obtain a better result; definitely, the higher the accuracy is, the more accurate the processing result of the neural network for the task data is. The preset condition may be: after X cycles, Y sampling neural networks with higher accuracies are selected from the N "sampling neural networks" as output target neural networks, wherein X, N, and Y are individually integers greater than or equal to 1.

In an optional example of the embodiments of a method for generating a neural network structure of the present application, after step 103, the method further comprises: in response to that the accuracy meets the preset condition, using the sampling neural network meeting the preset condition as the target neural network; or, in response to that the accuracy does not meet the preset condition and the sampling for the neural network structure has reached a preset frequency, using the current sampling neural network as the target neural network.

In this embodiment, it is proposed that when the sampling neural network firstly constructed by the network block meets the preset condition, the sampling neural network is directly used as the target neural network, or when the sampling reaches the preset frequency, the obtained sampling neural network is used as the target neural network so as to increase the generation rate of the neural network structure.

Persons of ordinary skill in the art may understand that all or some steps for implementing the embodiments of the foregoing method may be achieved by a program by instructing related hardware; the foregoing program can be stored in a computer readable storage medium; and when the program is executed, steps including the embodiments of the foregoing method are executed. Moreover, the foregoing storage medium includes various media capable of storing program codes such as ROM, RAM, a magnetic disk, or an optical disk.

Figure 5:
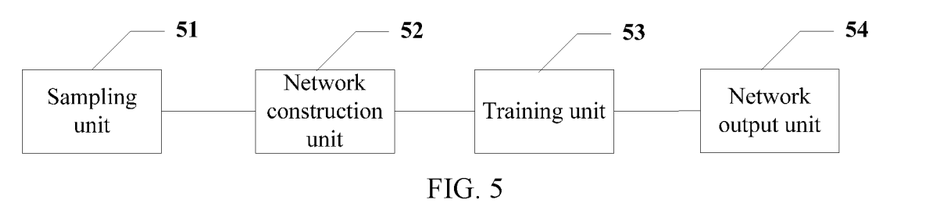
FIG. 5 is a schematic structural diagram of an embodiment of an apparatus for generating a neural network structure of the present application.

FIG. 5 is a schematic structural diagram of an embodiment of an apparatus for generating a neural network structure of the present application. The apparatus of the embodiment can be used to implement the embodiments of the method of the present application. As shown in FIG. 5, the apparatus of the embodiment comprises: a sampling unit 51, configured to sample a neural network structure to generate a network block, the network block comprising at least one network layer; a network construction unit 52, configured to construct a sampling neural network based on the network block; a training unit 53, configured to train the sampling neural network based on sample data, and obtain an accuracy corresponding to the sampling neural network; and a network output unit 54, configured to, in response to that the accuracy does not meet a preset condition, regenerate a new network block according to the accuracy until a sampling neural network constructed by the new network block meets the preset condition, and use the sampling neural network meeting the preset condition as a target neural network.

Based on the apparatus for generating a neural network structure provided in the embodiment of the present application, a neural network structure is sampled to generate a network block; a sampling neural network is constructed based on the network block, where construction of the sampling neural network by means of sampling avoids manual network structure configuration; the sampling neural network is trained based on sample data, and an accuracy corresponding to the sampling neural network is obtained, where by means of training, parameters in the sampling neural network get better for a current structure so that a better accuracy corresponding to the sampling neural network can be obtained; and in response to that the accuracy does not meet a preset condition, a new network block is regenerated according to the accuracy until a sampling neural network constructed by the new network block meets the preset condition, and the sampling neural network meeting the preset condition is used as a target neural network. For a sampling neural network generated by means of reinforcement learning based on sample data, the sampling neural network can achieve an expected accuracy for a task and/or data corresponding to sample data, thereby reducing costs and time for network structure design.

According to another embodiment of an apparatus for generating a neural network structure of the present application, on the basis of the embodiment above, a sampling unit 51 comprises: a probability sampling module, configured to sample a neural network structure based on a probability vector to obtain at least one type of network layers, network parameters corresponding to the at least one type of network layers, and a connection mode between the at least one type of network layers; and a network block generation module, configured to stack the at least one type of network layers to constitute a network block.

In this embodiment, because a network layer database comprises at least one type of network layers, at least one type of network layers can be sampled by performing sampling through type and number probability vectors of the corresponding network layers; a network layer has corresponding network parameters, and thus network parameters of a corresponding network layer are also acquired in a sampling process; and different network layers have respective preset connection modes, and thus optionally, a connection mode between network layers can also be acquired while the network layers are acquired. Each probability value in a probability vector corresponds to one type of network layers; when the probability value corresponding to a certain type of network layers is 0, the network block constituted by means of sampling does not comprise the type of network layers; and the probability value in the probability vector can also be based to determine the number of each type of network layers obtained by means of sampling, and the sampled number of each type of network layers is not limited to one.

In an optional example of the embodiments of an apparatus for generating a neural network structure of the present application, the network layer comprises any one or more of: a convolution layer, a max pooling layer, an average pooling layer, an identity layer, an elemental add layer, and a concat layer.

In an optional example of the embodiments of an apparatus for generating a neural network structure of the present application, the network block generation module can be configured to analyze the network layers obtained by sampling to obtain at least one type of the network layers, a number of at least one type of the network layers, and a connection sequence of at least one type of the network layers; and connecting the obtained network layers according to the connection sequence corresponding to the at least one type of network layers through a connection relationship between the at least one type of network layers so as to obtain a network block.

According to yet another embodiment of an apparatus for generating a neural network structure of the present application, on the basis of the embodiments above, the network output unit 54 can be configured to adjust the probability vector of sampling the neural network structure according to the accuracy corresponding to the sampling neural network, and sampling the neural network structure through the adjusted probability vector, so as to generate a new network block.

In this embodiment, optionally, the structure of the network block is adjusted by means of reinforcement learning. When the accuracy of the neural network cannot reach a set value, it is indicated that this neural network structure is not good enough, a low reward is returned, sampling is performed again to constitute the new network block, and the neural network is constructed with the new network block until a neural network of which the accuracy comes up to the standard is obtained.

According to another embodiment of an apparatus for generating a neural network structure of the present application, on the basis of the embodiments above, the training unit 53 comprises: a network processing module, configured to process the sample data by using the sampling neural network to obtain a processing result; an error calculation module, configured to calculate an error value between supervision information marked in the sample data and the processing result by using a loss function, the sample data being marked with the supervision information; and a network training module, configured to train the sampling neural network based on the error value until the sampling neural network meets a convergence condition.

The sample data is marked with the supervision information; the supervision information is a known target result of the sample data needing to be processed corresponding to the sampling neural network; and the content of the supervision information determines functions of the trained neural network.

In this embodiment, in order to ensure that the structure of a constructed neural network is adapted to specific task data, it is required to use sample data corresponding to the task data to train the neural network so as to recognize whether the neural network can accurately process the task data. The common reverse gradient algorithm in the art can be used to implement the neural network training process. The training result is that parameters in the neural network get better. The error value between the supervision information and the processing result obtained at the moment can be used to determine the accuracy of the neural network. The accuracy is inversely proportional to the error value, i.e., the greater the error value is, the smaller the accuracy is, and thus the poorer the processing effect of the sample data by the neural network is, and the smaller the error value is, the greater the accuracy is, and thus the better the processing effect of the sample data by the neural network is.

In an optional example of the embodiments of an apparatus for generating a neural network structure of the present application, the network training module can be configured to: in response to that a convergence rate of the loss function is greater than or equal to a preset value, adjust parameters in the sampling neural network through a reverse gradient algorithm according to the obtained error value to obtain an adjusted sampling neural network until the convergence rate of the loss function corresponding to the adjusted neural network is smaller than the preset value.

In an optional example of the embodiments of an apparatus for generating a neural network structure of the present application, the network training module can be configured to: in response to that a frequency of calculating the error value using the loss function is smaller than a preset value, adjust parameters in the sampling neural network through a reverse gradient algorithm according to the obtained error value to obtain an adjusted sampling neural network, and add the frequency of calculating the error value using the loss function by 1 until the frequency of calculating the error value using the loss function corresponding to the adjusted neural network is greater than or equal to the preset value.

In an optional example of the embodiments of an apparatus for generating a neural network structure of the present application, the training unit 53 may further comprise: an accuracy predication module, configured to calculate a predictive accuracy of the sampling neural network according to the error value of the trained sampling neural network; and an accuracy adjustment module, configured to subtract a preset proportion of network computing complexity and a preset proportion of network density based on the predictive accuracy to obtain an accuracy corresponding to the sampling neural network, the network computing complexity and the network density corresponding to the sampling neural network.

According to another embodiment of an apparatus for generating a neural network structure of the present application, on the basis of the embodiments above, the sampling unit 51 can be configured to sample a neural network structure to generate N network blocks, N being an integer greater than zero; the network construction unit 52 can be configured to respectively construct N sampling neural networks based on the N network blocks; the training unit 53 can be configured to respectively train the N sampling neural networks based on sample data, and obtain N accuracies corresponding to the N sampling neural networks; and the network output unit 54 can be configured to, in response to that there is no accuracy among the N accuracies that meets a preset condition, respectively regenerate N new network blocks according to the N accuracies until there is a neural network among the N sampling neural networks respectively constructed by the N new network blocks that meets the preset condition, and use the sampling neural network meeting the preset condition as a target neural network.

In this embodiment, simultaneous training of multiple different neural networks is achieved by constructing a distributed system comprising an agent, a network structure controller, and at least one training node (environment variable, env), such that the generation rate of a neural network structure is increased, the training time is saved, and the training efficiency of the neural network is improved.

In an optional example of the embodiments of an apparatus for generating a neural network structure of the present application, the apparatus further comprises: a target judgment unit, configured to, in response to that the accuracy meets the preset condition, use the sampling neural network meeting the preset condition as the target neural network; or, in response to that the accuracy does not meet the preset condition and the sampling for the neural network structure has reached a preset frequency, use a current sampling neural network as a target neural network.

According to an aspect of the embodiments of the present application, an electronic device is provided, comprising a processor, the processor comprising any of the embodiments of an apparatus for generating a neural network structure of the present application.

According to an aspect of the embodiments of the present application, an electronic device is provided, comprising: a memory, configured to store executable instructions; and a processor, configured to communicate with the memory to execute the executable instructions so as to complete operations of any of the embodiments of a method for generating a neural network structure of the present application.

According to an aspect of the embodiments of the present application, a computer storage medium is provided, configured to store computer readable instructions, wherein the instructions are executed to implement operations of any of the embodiments of a method for generating a neural network structure of the present application.

Figure 6:
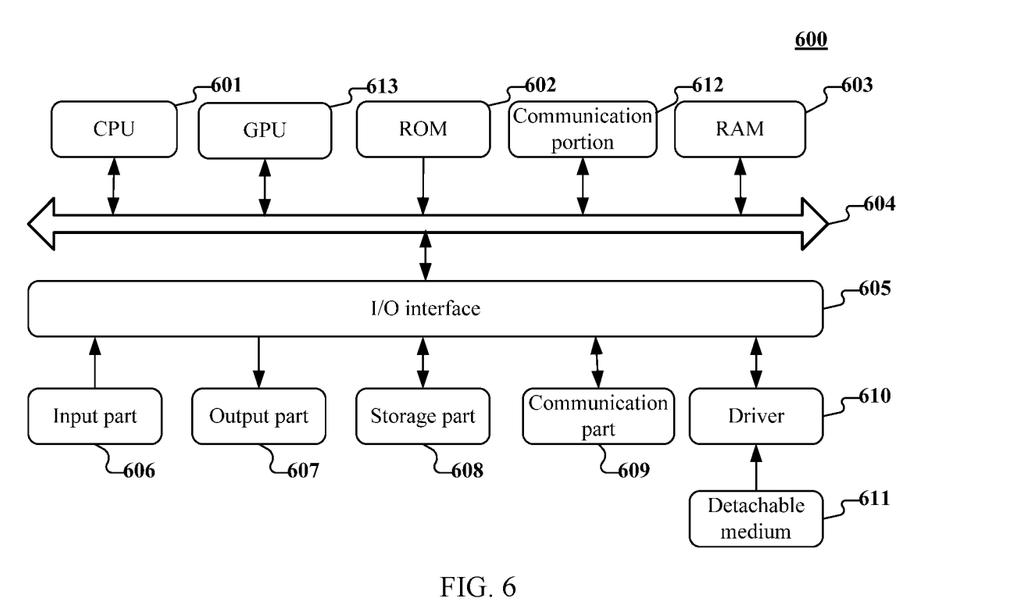
FIG. 6 is a schematic structural diagram of an embodiment of an electronic device of the present application.

Embodiments of the present application further provide an electronic device, which, for example, may be a mobile terminal, a Personal Computer (PC), a tablet computer, and a server. The following content is made with reference to FIG. 6. FIG. 6 is a schematic structural diagram of an electronic device 600 suitable for realizing a terminal device or a server of the embodiments of the present application. As shown in FIG. 6, a computer system 600 comprises one or more processors, a communication portion, etc.; the one or more processors are, for example, one or more Central Processing Units (CPUs) 601, and/or one or more Graphics Processing Units (GPUs) 613, etc.; and the processors can execute various proper actions and processing according to executable instructions stored in a Read-Only Memory (ROM) 602 or executable instructions loaded in a Random Access Memory (RAM) 603 from a storage part 608. The communication portion 612 may comprise, but is not limited to, a network card, and the network card may comprise, but is not limited to, an Infiniband (IB) network card. The processors may communicate with the ROM 602 and/or the RAM 603 to execute the executable instructions, are connected to the communication portion 612 through a bus 604, and communicates with other target devices through the communication portion 612, so as to complete operations corresponding to any method provided in the embodiments of the present application, for example, sampling a neural network structure to generate a network block, the network block comprising at least one network layer, constructing a sampling neural network based on the network block, training the sampling neural network based on sample data, and obtaining an accuracy corresponding to the sampling neural network, and in response to that the accuracy does not meet a preset condition, regenerating a new network block according to the accuracy until a sampling neural network constructed by the new network block meets the preset condition, and using the sampling neural network meeting the preset condition as a target neural network.

In addition, various programs and data required for operations of the apparatus may also be stored in RAM 603. CPU 601, ROM 602, and RAM 603 are connected to one another through the bus 604. In the presence of RAM 603, ROM 602 is an optional module. RAM 603 stores the executable instructions, or writes the executable instructions into ROM 602 during running, and the executable instructions enable the processors 601 to execute operations corresponding to the communication method. An input/output (I/O) interface 605 is also connected to the bus 604. The communication portion 612 may be configured in an integrated manner or may be configured to have multiple sub-modules (such as multiple IB network cards), and is linked on the bus.

Components connected to the I/O interface 605 are as follows: an input part 606 including a keyboard, a mouse, etc.; an output part 607 including a Cathode Ray Tube (CRT), a Liquid Crystal Display (LCD), a loudspeaker, etc.; the storage part 608 including a hard disk, etc.; and a communication part 609 including an LAN card, a network interface card of a modem, etc. The communication part 609 carries out communication processing via networks, such as Internet. A driver 610 is also connected to the I/O interface 605 according to requirements. A detachable medium 611, such as a magnetic disk, an optical disk, a magneto-optical disk, and a semiconductor memory, is installed on the driver 610 according to requirements, so as to facilitate reading of computer programs therefrom and installation of same on the storage part 608.

It should be noted that, the architecture shown in FIG. 6 is merely an optional implementation. During optional practice, a number and types of the components in FIG. 6 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the protection scope of the present application.

In particular, according to the embodiments of the present application, the process above described with reference to the flowchart may be implemented as computer software programs. For example, the embodiments of the present application comprise a computer program product, which comprises computer programs tangibly comprised on a machine readable medium; the computer programs comprise program codes for executing the method shown by the flowchart; and the program codes may comprise corresponding instructions for correspondingly executing steps of the method provided in the embodiments of the present application, for example, sampling a neural network structure to generate a network block, the network block comprising at least one network layer, constructing a sampling neural network based on the network block, training the sampling neural network based on sample data, and obtaining an accuracy corresponding to the sampling neural network, and in response to that the accuracy does not meet a preset condition, regenerating a new network block according to the accuracy until a sampling neural network constructed by the new network block meets the preset condition, and using the sampling neural network meeting the preset condition as a target neural network. In such embodiments, the computer programs can be downloaded and installed from a network through the communication part 609, and/or installed from the detachable medium 611. When the computer programs are executed by the CPU 601, the functions defined in the method of the present application are implemented.

The embodiments of the present description are described in a progressive manner, and each embodiment focuses on illustrating differences from one another. Mutual references may be made to the same or similar portions among these embodiments. The system of the embodiments basically corresponds to the method of the embodiments, and therefore is described relatively simply. For related parts, reference may be made to the method description.

The method and apparatus of the present application may be achieved in many manners. For example, the method and apparatus of the present application can be achieved through software, hardware, firmware, or any combination of software, hardware, and firmware. The sequence of the steps of the method is just for description, and thus the steps of the method of the present application are not limited to the specifically described sequence unless otherwise stated specifically. In addition, in some embodiments, the present application can also be implemented as programs recorded in a recording medium, and these programs comprise machine readable instructions for implementing the method according to the present application. Therefore, the present application further covers the recording medium that stores programs for executing the method according to the present application.

The specification of the present application is presented for purposes of illustration and description, and is not intended to be exhaustive or to limit the present application to the form disclosed. Many modifications and variations are obvious to persons of ordinary skill in the art. The embodiments are selected and described in order to better illustrate the principles and practical applications of the present application, and to make persons of ordinary skill in the art to understand the present application so as to design embodiments suitable for particular purposes and with various modifications.

The invention claimed is:

1. A method for generating a target neural network structure, comprising:
    sampling a neural network structure to generate a network block, the network block comprising at least one network layer;
    constructing a sampling neural network based on the network block;
    training the sampling neural network based on sample data, and obtaining an accuracy corresponding to the sampling neural network; and
    in response to that the accuracy does not meet a preset condition, regenerating a new network block according to the accuracy until a sampling neural network constructed by the new network block meets the preset condition, and using the sampling neural network meeting the preset condition as a target neural network.

2. The method according to claim 1, wherein the sampling the neural network structure to generate a network block comprises:
sampling the neural network structure based on a probability vector to obtain at least one type of network layers, network parameters corresponding to the at least one type of network layers, and a connection mode between the at least one type of network layers; and
stacking the at least one type of network layers to obtain a network block.

3. The method according to claim 1, wherein the at least one network layer comprises at least one of:
a convolution layer, a max pooling layer, an average pooling layer, an identity layer, an elemental add layer, or a concat layer.

4. The method according to claim 2, wherein the stacking the at least one type of network layers to obtain a network block comprises:
analyzing the network layers obtained by sampling to obtain at least one type of the network layers, a number of at least one type of the network layers, and a connection sequence of at least one type of the network layers; and
connecting the obtained network layers, according to the connection sequence corresponding to the at least one type of network layers through a connection relationship between the at least one type of network layers to obtain a network block.

5. The method according to claim 1, wherein the regenerating a new network block according to the accuracy comprises:
adjusting a probability vector of sampling the neural network structure according to the accuracy corresponding to the sampling neural network, and sampling the neural network structure through the adjusted probability vector, to generate a new network block.

6. The method according to claim 1, wherein the training the sampling neural network based on sample data comprises:
processing the sample data by using the sampling neural network to obtain a processing result;
calculating an error value between supervision information marked in the sample data and the processing result by using a loss function, the sample data being marked with the supervision information; and
training the sampling neural network based on the error value until the sampling neural network meets a convergence condition.

7. The method according to claim 6, wherein the training the sampling neural network based on the error value until the sampling neural network meets a convergence condition comprises:
in response to that a convergence rate of the loss function is greater than or equal to a preset value, adjusting parameters in the sampling neural network through a reverse gradient algorithm according to the obtained error value to obtain an adjusted sampling neural network until the convergence rate of the loss function corresponding to the adjusted neural network is smaller than the preset value.

8. The method according to claim 6, wherein the training the sampling neural network based on the error value until the sampling neural network meets a convergence condition comprises:
in response to a number of times of calculating the error value using the loss function being smaller than a preset value, adjusting parameters in the sampling neural network through a reverse gradient algorithm according to the obtained error value to obtain an adjusted sampling neural network, and adding the number of times of calculating the error value using the loss function by 1 until the number of times of calculating the error value using the loss function corresponding to the adjusted neural network is greater than or equal to the preset value.

9. The method according to claim 6, wherein the obtaining an accuracy corresponding to the sampling neural network comprises:
calculating a predictive accuracy of the sampling neural network according to the error value of the trained sampling neural network, wherein the calculating further comprises subtracting a preset proportion of a network computing complexity measurement and a preset proportion of a network density measurement based on the predictive accuracy to obtain an accuracy corresponding to the sampling neural network, the network computing complexity and the network density corresponding to the sampling neural network, wherein the network computing complexity measurement comprises a number of floating-point operations per second, and the network density measurement comprises a result of dividing a number of edges of a mathematical map by a number of points of the mathematical map.

10. The method according to claim 1, wherein the sampling the neural network structure to generate a network block comprises:
sampling the neural network structure to generate N network blocks, N being an integer greater than zero;
the constructing a sampling neural network based on the network block comprises:
respectively constructing N sampling neural networks based on the N network blocks;
the training the sampling neural network based on sample data, and obtaining an accuracy corresponding to the sampling neural network comprise:
respectively training the N sampling neural networks based on sample data, and obtaining N accuracies corresponding to the N sampling neural networks; and
wherein in response to determining that a respective accuracy of the N accuracies does not meet a preset condition, regenerating a new network block according to the respective accuracy until a sampling neural network constructed by the new network block meets the preset condition, and using the sampling neural network meeting the preset condition as a target neural network comprises:
in response to that there is no accuracy among the N accuracies that meets a preset condition, respectively regenerating N new network blocks according to the N accuracies until there is a neural network among the N sampling neural networks respectively constructed by the N new network blocks that meets the preset condition, and using the sampling neural network meeting the preset condition as a target neural network.

11. The method according to claim 1, wherein the regenerating a new network block according to the accuracy comprises:
sampling the neural network structure again to generate the new network block;

wherein after obtaining an accuracy corresponding to the sampling neural network, the method further comprises:

in response to that the accuracy meets the preset condition, using the sampling neural network meeting the preset condition as the target neural network;

or, in response to that the accuracy does not meet the preset condition and the sampling for the neural network structure has reached a preset number of times, using a current sampling neural network as the target neural network.

12. An apparatus for generating a target neural network structure, comprising:

a processor; and a memory storing instructions, the instructions when executed by the processor, cause the processor to perform operations, the operations comprising:

sampling a neural network structure to generate a network block, the network block comprising at least one network layer;

constructing a sampling neural network based on the network block;

training the sampling neural network based on sample data, and obtaining an accuracy corresponding to the sampling neural network; and in response to that the accuracy does not meet a preset condition, regenerating a new network block according to the accuracy until a sampling neural network constructed by the new network block meets the preset condition, and using the sampling neural network meeting the preset condition as a target neural network.

13. The apparatus according to claim 12, wherein the sampling the neural network structure to generate a network block comprises:

sampling a neural network structure based on a probability vector to obtain at least one type of network layers, network parameters corresponding to the at least one type of network layers, and a connection mode between the at least one type of network layers; and stacking the at least one type of network layers to obtain a network block.

14. The apparatus according to claim 13, wherein the stacking the at least one type of network layers to obtain a network block comprises:

analyzing the network layers obtained by sampling to obtain at least one type of the network layers, a number of at least one type of the network layers, and a connection sequence of at least one type of the network layers; and connecting the obtained network layers according to the connection sequence corresponding to the at least one type of network layers through a connection relationship between the at least one type of network layers to obtain a network block.

15. The apparatus according to claim 12, wherein the regenerating a new network block according to the accuracy comprises:

adjusting a probability vector of sampling the neural network structure according to the accuracy corresponding to the sampling neural network, and sampling the neural network structure through the adjusted probability vector, to generate a new network block.

16. The apparatus according to claim 12, wherein the training the sampling neural network based on sample data comprises:

processing the sample data by using the sampling neural network to obtain a processing result;

calculating an error value between supervision information marked in the sample data and the processing result by using a loss function, the sample data being marked with the supervision information; and training the sampling neural network based on the error value until the sampling neural network meets a convergence condition.

17. The apparatus according to claim 16, wherein the training the sampling neural network based on the error value until the sampling neural network meets a convergence condition comprises:

in response to that a convergence rate of the loss function is greater than or equal to a preset value, adjusting parameters in the sampling neural network through a reverse gradient algorithm according to the obtained error value to obtain an adjusted sampling neural network until the convergence rate of the loss function corresponding to the adjusted neural network is smaller than the preset value; or in response to a number of times of calculating the error value using the loss function being than a preset value, adjusting parameters in the sampling neural network through a reverse gradient algorithm according to the obtained error value to obtain an adjusted sampling neural network, and add the number of times of calculating the error value using the loss function by 1 until the number of times of calculating the error value using the loss function corresponding to the adjusted neural network is greater than or equal to the preset value.

18. The apparatus according to claim 16, wherein the obtaining an accuracy corresponding to the sampling neural network comprises:

calculating a predictive accuracy of the sampling neural network according to the error value of the trained sampling neural network, wherein the calculating further comprises subtracting a preset proportion of a network computing complexity measurement and a preset proportion of a network density measurement based on the predictive accuracy to obtain an accuracy corresponding to the sampling neural network, the network computing complexity and the network density corresponding to the sampling neural network, wherein the network computing complexity measurement comprises a number of floating-point operations per second, and the network density measurement comprises a result of dividing a number of edges of a mathematical map by a number of points of the mathematical map.

19. The apparatus according to claim 12, wherein the regenerating a new network block according to the accuracy comprises:

sampling the neural network structure again to generate the new network block;

wherein the operations further comprising:

in response to that the accuracy meets the preset condition, using the sampling neural network meeting the preset condition as the target neural network;

or, in response to that the accuracy does not meet the preset condition and the sampling for the neural network structure has reached a preset number of times, using a current sampling neural network as a target neural network.

20. A non-transitory computer storage medium for storing computer readable instructions, the computer readable instruction when executed by a processor, causes the processor to perform operations, the operations comprising:
- sampling a neural network structure to generate a network block, the network block comprising at least one network layer;
- constructing a sampling neural network based on the network block;
- training the sampling neural network based on sample data, and obtaining an accuracy corresponding to the sampling neural network; and
- in response to that the accuracy does not meet a preset condition, regenerating a new network block according to the accuracy until a sampling neural network constructed by the new network block meets the preset condition, and using the sampling neural network meeting the preset condition as a target neural network.

\* \* \* \* \*